(12) United States Patent
Rodatz et al.

(10) Patent No.: US 11,725,602 B2
(45) Date of Patent: Aug. 15, 2023

(54) METHOD FOR ASCERTAINING THE NITROGEN OXIDE FRACTION AND/OR AMMONIA FRACTION IN THE EXHAUST GAS OF AN INTERNAL COMBUSTION ENGINE

(71) Applicant: Vitesco Technologies GmbH, Regensburg (DE)

(72) Inventors: Paul Rodatz, Munich (DE); Gerhard Haft, Munich (DE); Erwin Achleitner, Munich (DE); Florian Kleiner, Munich (DE)

(73) Assignee: VITESCO TECHNOLOGIES GMBH, Hanover (DE)

( * ) Notice: Subject to any disclaimer, the term of this patent is extended or adjusted under 35 U.S.C. 154(b) by 0 days.

(21) Appl. No.: 17/616,914

(22) PCT Filed: Jun. 3, 2020

(86) PCT No.: PCT/EP2020/065331
§ 371 (c)(1),
(2) Date: Dec. 6, 2021

(87) PCT Pub. No.: WO2020/245186
PCT Pub. Date: Dec. 10, 2020

(65) Prior Publication Data
US 2022/0316416 A1 Oct. 6, 2022

(30) Foreign Application Priority Data
Jun. 6, 2019 (DE) .................... 10 2019 208 254.8

(51) Int. Cl.
*F02D 41/14* (2006.01)
(52) U.S. Cl.
CPC ..... *F02D 41/1454* (2013.01); *F02D 41/1445* (2013.01); *F02D 41/1453* (2013.01);
(Continued)

(58) Field of Classification Search
CPC ............. F02D 41/1454; F02D 41/1445; F02D 41/1453; F02D 41/1459; F02D 41/1463;
(Continued)

(56) References Cited

U.S. PATENT DOCUMENTS

| 6,301,878 B1 | 10/2001 | Zhang ............................ 60/274 |
| 2010/0175368 A1 | 7/2010 | Schulze ......................... 60/273 |

(Continued)

FOREIGN PATENT DOCUMENTS

| DE | 199 29 042 | 12/2000 | ............. B01D 53/88 |
| DE | 10 2012 022 841 | 5/2014 | ............. F01N 11/00 |

(Continued)

OTHER PUBLICATIONS

Search Report for International Application No. PCT/EP2020/065331, 10 pages, dated Aug. 12, 2020.
(Continued)

*Primary Examiner* — Joseph J Dallo
(74) *Attorney, Agent, or Firm* — Slayden Grubert Beard PLLC

(57) ABSTRACT

Various embodiments of the teachings herein include a method for determining the nitrogen oxide content and/or ammonia content in the exhaust gas of an internal combustion engine with a catalytic converter arranged in an exhaust tract and an exhaust gas sensor downstream of the catalytic converter. In some embodiments, the method comprises: determining an operating state of the internal combustion engine, the operating state indicating either lean operation or rich operation of the internal combustion engine; generating a signal using the exhaust gas sensor; and determining the nitrogen oxide content and/or ammonia content in the exhaust gas at least partially based on the determined operating state of the internal combustion engine and the signal.

9 Claims, 1 Drawing Sheet

(52) U.S. Cl.
CPC ..... *F02D 41/1459* (2013.01); *F02D 41/1463* (2013.01); *F02D 2041/1468* (2013.01)

(58) Field of Classification Search
CPC .. F02D 2041/1468; Y02T 10/12; Y02T 10/40; F01N 3/101; F01N 11/00; F01N 2900/0601; F01N 2900/1404; F01N 2900/1411; F01N 2900/1602; F01N 11/007; F01N 2560/025
See application file for complete search history.

(56) References Cited

U.S. PATENT DOCUMENTS

| | | | | |
|---|---|---|---|---|
| 2016/0123945 | A1 | 5/2016 | Qi | G01N 33/00 |
| 2016/0376963 | A1* | 12/2016 | Lee | F01N 3/2066 60/274 |
| 2017/0074190 | A1* | 3/2017 | Lee | F01N 3/0871 |
| 2017/0167337 | A1* | 6/2017 | Choung | F01N 3/0842 |
| 2017/0292433 | A1* | 10/2017 | Hayashita | F01N 9/00 |
| 2017/0321588 | A1* | 11/2017 | Aoki | G01M 15/102 |
| 2017/0356323 | A1* | 12/2017 | Hayashita | F01N 11/007 |
| 2017/0356378 | A1* | 12/2017 | Hayashita | G01N 27/4175 |
| 2017/0356392 | A1* | 12/2017 | Hayashita | F01N 9/00 |
| 2018/0133707 | A1* | 5/2018 | Nam | F01N 3/0871 |
| 2018/0283308 | A1* | 10/2018 | Hayashita | F02D 41/1447 |
| 2019/0242314 | A1* | 8/2019 | Harmsen | F02D 41/1446 |
| 2019/0277174 | A1* | 9/2019 | Smirnov | F01N 3/0842 |
| 2020/0182121 | A1* | 6/2020 | Zhang | F01N 3/2006 |

FOREIGN PATENT DOCUMENTS

| | | | |
|---|---|---|---|
| DE | 10 2012 220 722 | 5/2014 | ............. F01N 9/00 |
| JP | 2008-202 425 | 9/2008 | ............. F02D 41/04 |
| WO | WO-03087550 A1 * | 10/2003 | ............. F01N 11/00 |
| WO | WO-2011124357 A1 * | 10/2011 | ......... B01D 53/9477 |

OTHER PUBLICATIONS

Office Action for DE Application No. 10 2019 208 254.8, 8 pages, dated Feb. 6, 2020.

* cited by examiner

METHOD FOR ASCERTAINING THE NITROGEN OXIDE FRACTION AND/OR AMMONIA FRACTION IN THE EXHAUST GAS OF AN INTERNAL COMBUSTION ENGINE

CROSS-REFERENCE TO RELATED APPLICATIONS

This application is a U.S. National Stage Application of International Application No. PCT/EP2020/065331 filed Jun. 3, 2020, which designates the United States of America, and claims priority to DE Application No. 10 2019 208 254.8 filed Jun. 6, 2019, the contents of which are hereby incorporated by reference in their entirety.

TECHNICAL FIELD

The present disclosure relates to internal combustion engines. Various embodiments of the teachings herein include methods for determining the nitrogen oxide content and/or ammonia content in the exhaust gas of an internal combustion engine and an exhaust tract.

BACKGROUND

Catalytic converters are used for exhaust gas aftertreatment in vehicles in order to convert air pollutants and not to emit them into the environment. Exhaust gas aftertreatment using a three-way catalytic converter converts carbon monoxide (CO), nitrogen oxides (NOx) and unburnt hydrocarbons (HC) into carbon dioxide (CO2), nitrogen (N2) and water (H2O).

The air-fuel mixture for an internal combustion engine is controlled by means of a cascaded closed-loop control system consisting of an inner control loop that controls the lambda value upstream of a catalytic converter, and an outer control loop that controls the lambda value downstream of the catalytic converter. More particularly, the catalytic converter here should be kept within the optimal conversion window. For this purpose, it is desirable to control the oxygen load of the catalytic converter, especially of the three-way catalytic converter, in such a way that the catalytic converter is saturated/loaded with about 50% oxygen. This can ensure sufficient reliability against any perturbations of the system in the lean or rich direction.

SUMMARY

The teachings of the present disclosure include methods and an exhaust tract in which the nitrogen oxide content and/or ammonia content in the exhaust gas of an internal combustion engine may be determined simply and precisely. For example, some embodiments of the teachings herein include a method for determining the nitrogen oxide content and/or ammonia content in the exhaust gas of an internal combustion engine which comprises a catalytic converter (100), e.g., a three-way catalytic converter, arranged in an exhaust tract (10) of the internal combustion engine and an exhaust gas sensor (110) arranged downstream of the catalytic converter (100), wherein the method comprises: determining an operating state of the internal combustion engine which indicates lean operation or rich operation of the internal combustion engine, generating at least one signal using the exhaust gas sensor (110) and determining the nitrogen oxide content and/or ammonia content in the exhaust gas of the internal combustion engine at least partially based on the determined operating state of the internal combustion engine and at least partially based on the at least one signal of the exhaust gas sensor (110).

In some embodiments, the method further comprises determining a lambda value using the exhaust gas sensor (110), wherein the determining of the operating state of the internal combustion engine is carried out at least partially based on the determined lambda value.

In some embodiments, the at least one generated signal of the exhaust gas sensor (110) indicates the nitrogen oxide content in the exhaust gas when the determined lambda value is greater than a lambda threshold value, and/or the at least one generated signal of the exhaust gas sensor (110) indicates the ammonia content in the exhaust gas when the determined lambda value is smaller than the lambda threshold value.

In some embodiments, the lambda threshold value is determined based on the temperature of the exhaust gas, the temperature of the catalytic converter, the exhaust gas mass flow, the exhaust gas volume flow, the exhaust gas flow rate and/or the catalytic converter aging condition or the lambda threshold value is predetermined as a specified value.

In some embodiments, the method further comprises determining the exhaust gas mass flow, wherein the determining of the nitrogen oxide content and/or ammonia content in the exhaust gas of the internal combustion engine is further based at least partially on a mass flow factor when the determined exhaust gas mass flow is greater than a predetermined exhaust gas mass flow threshold value.

In some embodiments, the mass flow factor is determined based on the temperature of the exhaust gas, the temperature of the catalytic converter, the exhaust gas mass flow, the exhaust gas volume flow, the exhaust gas flow rate and/or the catalytic converter aging condition.

In some embodiments, the method further comprises determining a sensitivity of the exhaust gas sensor for ammonia, wherein when determining the ammonia content in the exhaust gas of the internal combustion engine the determined sensitivity of the exhaust gas sensor (110) for ammonia is considered.

In some embodiments, the method further comprises: determining the carbon monoxide content in the exhaust gas of the internal combustion engine at least partially based on the determined ammonia content in the exhaust gas of the internal combustion engine and at least partially based on a carbon monoxide correlation factor and/or determining the hydrocarbon content in the exhaust gas of the internal combustion engine at least partially based on the determined ammonia content in the exhaust gas of the internal combustion engine and at least partially based on a hydrocarbon correlation factor.

In some embodiments, the carbon monoxide correlation factor and/or the hydrocarbon correlation factor is determined based on the temperature of the exhaust gas, the temperature of the catalytic converter, the exhaust gas mass flow, the exhaust gas volume flow, the exhaust gas flow rate and/or the catalytic converter aging condition.

As another example, some embodiments include an exhaust tract (10) for an internal combustion engine, comprising: a catalytic converter (100) for aftertreatment of the exhaust gas of the internal combustion engine, an exhaust gas sensor (110) which is arranged downstream of the catalytic converter (100) and configured for generating a signal indicating the content of nitrogen oxide and/or ammonia in the exhaust gas and a control unit (120) which receives the signals of the exhaust gas sensor (110) and is configured to execute a method as claimed in any of the preceding claims.

BRIEF DESCRIPTION OF THE DRAWINGS

Further teachings of the present disclosure are apparent to a person skilled in the art by putting the present teaching into practice and taking into consideration the accompanying drawings, in which.

DETAILED DESCRIPTION

Figure 1:
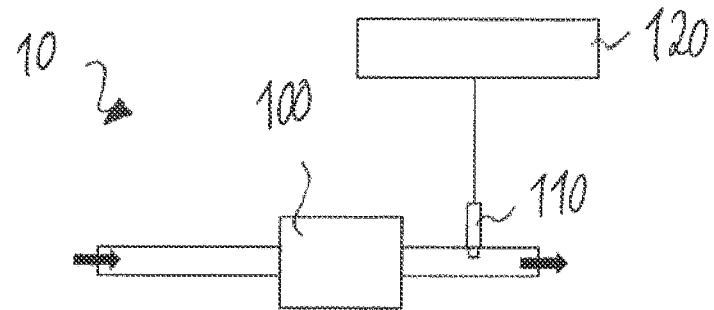
FIG. 1 shows an exhaust tract of an internal combustion engine comprising a catalytic converter and an exhaust gas sensor incorporating teachings of the present disclosure.

In case of oxygen deficiency in the exhaust gas, i.e. in case of rich exhaust gas, a catalytic converter, in particular three-way catalytic converter, produces ammonia but the nitrogen oxides in the exhaust gas are almost completely reduced in the catalytic converter. By contrast, in case of oxygen excess, i.e. in case of lean exhaust gas, the catalytic converter is able to reduce the nitrogen oxides in the exhaust gas only incompletely. Accordingly, a known lambda value allows determination of the nitrogen oxide content and/or ammonia content in the exhaust gas downstream of the catalytic converter. An exhaust gas sensor, for example a nitrogen oxide sensor, on account of its (cross-) sensitivity for ammonia indicates the sum of the nitrogen oxide content and the ammonia content and by determining the operating state of the internal combustion engine the two contents may be determined. This is because knowledge of the operating state of the internal combustion engine, i.e. whether the internal combustion engine is being operated rich or lean, allows the signal of the exhaust gas sensor to be used to determine the ammonia content and/or nitrogen content in the exhaust gas.

Some embodiments include a method for determining the nitrogen oxide content and/or ammonia content in the exhaust gas of an internal combustion engine which comprises a catalytic converter, e.g., three-way catalytic converter, arranged in an exhaust tract of the internal combustion engine and an exhaust gas sensor arranged downstream of the catalytic converter. The method comprises determining an operating state of the internal combustion engine which may indicate lean operation or rich operation, generating at least one signal using the exhaust gas sensor and determining the nitrogen oxide content and/or ammonia content in the exhaust gas of the internal combustion engine at least partially based on the determined operating state of the internal combustion engine and at least partially based on the at least one signal of the exhaust gas sensor.

As mentioned hereinabove, knowledge of the operating state of the internal combustion engine allows the signal of the exhaust gas sensor to be used to determine the nitrogen oxide content and/or ammonia content. If for example rich operation of the internal combustion engine is in effect almost all nitrogen oxides in the catalytic converter are reduced. The oxygen deficiency moreover causes ammonia to be produced in the catalytic converter and the signal of the exhaust gas sensor thus indicates almost entirely the ammonia content in the exhaust gas. In addition, the signal of the exhaust gas sensor can be evaluated while also considering the operating state of the internal combustion engine to distinguish between nitrogen oxide content and ammonia content.

In some embodiments, the method further comprises determining a lambda value using the exhaust gas sensor. The determining of the operating state of the internal combustion engine is carried out at least partially based on the determined lambda value. In particular the determined lambda value makes it possible to determine whether the operating state of the internal combustion engine is rich operation or lean operation, which in turn makes it possible to determine to what extent ammonia is or is not produced in the catalytic converter, e.g., three-way catalytic converter.

In some embodiments, the at least one generated signal of the exhaust gas sensor indicates the nitrogen oxide content in the exhaust gas when the determined lambda value is greater than a lambda threshold value. Furthermore the at least one generated signal of the exhaust gas sensor indicates the ammonia content in the exhaust gas when the determined lambda value is smaller than the lambda threshold value.

Exceeding the lambda threshold value results in a lean exhaust gas, i.e. oxygen excess in the exhaust gas, and the signal of the exhaust gas sensor thus indicates the nitrogen oxide content in the exhaust gas. By contrast, undershooting the lambda threshold value results in a rich exhaust gas, i.e. oxygen deficiency in the exhaust gas, and the signal of the exhaust gas sensor therefore indicates essentially the ammonia content in the exhaust gas.

In some embodiments, the lambda threshold value is predetermined as a specified value such as for example 1.0 or 200 mV or the lambda threshold value is dynamically determined based on the temperature of the exhaust gas, the temperature of the catalytic converter, the exhaust gas mass flow, the exhaust gas volume flow, the exhaust gas flow rate and/or the catalytic converter aging condition and is thus variably adapted according to the operating parameters of the internal combustion engine and/or the exhaust tract.

In some embodiments, the method further comprises determining the exhaust gas mass flow. The determining of the nitrogen oxide content and/or ammonia content in the exhaust gas of the internal combustion engine is further based at least partially on a mass flow factor when the determined exhaust gas mass flow is greater than a predetermined exhaust gas mass flow threshold value.

In particular, a large exhaust gas mass flow can result in incomplete conversion of the nitrogen oxides on account of insufficient residence time of the exhaust gas in the catalytic converter despite rich exhaust gas conditions. In this state both nitrogen oxides and ammonia may consequently simultaneously be present in the exhaust gas downstream of the catalytic converter. In some embodiments, when exceeding the predetermined exhaust gas mass flow threshold value a mass flow factor is considered which may then be used to simultaneously determine from the signal of the exhaust gas sensor the ammonia content and the nitrogen oxide content in the exhaust gas. The mass flow factor is in particular configured for dividing the signal of the exhaust gas sensor into a nitrogen oxide signal indicating the nitrogen oxide content and an ammonia signal indicating the ammonia content.

In some embodiments, the mass flow factor is determined based on the temperature of the exhaust gas, the temperature of the catalytic converter, the exhaust gas mass flow, the exhaust gas volume flow, the exhaust gas flow rate and/or the catalytic converter aging condition. The mass flow factor may therefore be a factor dynamically adapted to the operating parameters of the internal combustion engine and/or the exhaust tract.

In some embodiments, the method further comprises determining a sensitivity of the exhaust gas sensor for ammonia, wherein when determining the ammonia content in the exhaust gas of the internal combustion engine the determined sensitivity of the exhaust gas sensor for ammonia is considered. For example, the sensitivity may be a previously specified value or may be adapted according to the aging condition of the exhaust gas sensor during operation.

In some embodiments, the method further comprises determining the carbon monoxide content in the exhaust gas of the internal combustion engine at least partially based on the determined ammonia content in the exhaust gas of the internal combustion engine and at least partially based on a carbon monoxide correlation factor and/or determining the hydrocarbon content in the exhaust gas of the internal combustion engine at least partially based on the determined ammonia content in the exhaust gas of the internal combustion engine and at least partially based on a hydrocarbon correlation factor.

In some embodiments, the carbon monoxide correlation factor and/or the hydrocarbon correlation factor is determined based on the temperature of the exhaust gas, the temperature of the catalytic converter, the exhaust gas mass flow, the exhaust gas volume flow, the exhaust gas flow rate and/or the catalytic converter aging condition.

In some embodiments, the ammonia content can be a suitable indicator for the contents of carbon monoxide and hydrocarbons in the exhaust gas downstream of the catalytic converter, e.g., three-way catalytic converter. Using the carbon monoxide correlation factor or hydrocarbon correlation factor allows determination of the respective carbon monoxide content/hydrocarbon content in the exhaust gas based on the ammonia content.

Some embodiments include an exhaust tract for an internal combustion engine which comprises a catalytic converter for aftertreatment of the exhaust gas of the internal combustion engine, an exhaust gas sensor which is arranged downstream of the catalytic converter and configured for generating a signal indicating the content of nitrogen oxide and/or ammonia in the exhaust gas and a control unit which receives the signals of the exhaust gas sensor and is configured to execute a method as described herein.

In the context of the present disclosure the term "lean exhaust gas" describes an exhaust gas with an oxygen excess while the term "rich exhaust gas" describes an exhaust gas with an oxygen deficiency and in some cases an excess of unburnt fuel.

In addition, in the context of the present disclosure the term "linear lambda signal" describes the profile of the dimensionless lambda values indicating the air-fuel ratio of the combustion. By contrast in the context of the present disclosure the term "binary lambda signal" describes the profile of the lambda values (with units of [mV]) in the form of a signal of the exhaust gas sensor.

FIG. 1 shows an exemplary catalytic converter 100 that can be used in an exhaust tract 10 of an internal combustion engine (not shown), e.g., a gasoline engine, to convert air pollutants in the exhaust gas. The catalytic converter 100 is preferably a three-way catalytic converter for conversion of carbon monoxide (CO), nitrogen oxides (NOx) and unburnt hydrocarbons (HC) into carbon dioxide ($CO_2$), nitrogen ($N_2$), and water ($H_2O$). It will be self-evident to those skilled in the art that further units/apparatuses may be present in the exhaust tract 10, for example a particulate filter or a muffler.

Arranged downstream of the catalytic converter 100 is an exhaust gas sensor 110 configured for determining the content of nitrogen oxide and/or ammonia in the exhaust gas downstream of the catalytic converter 100. The exhaust gas sensor 110, which is sensitive to nitrogen oxide and/or ammonia, is, for example, a mixed potential sensor with a mixed potential electrode and/or a reference electrode. The exhaust gas sensor 110 is preferably a nitrogen oxide sensor that is cross-sensitive for ammonia.

Also assigned to the internal combustion engine is a control unit 120 which is in communicative connection with the exhaust gas sensor 110 and is configured for detecting and evaluating the signals thereof and controlling the operation of the internal combustion engine. Thus the control unit 120 is configured for receiving the sensor signal sent from the exhaust gas sensor 110 and determining therefrom the content of the nitrogen oxide and/or ammonia in the exhaust gas downstream of the catalytic converter 100 as more precisely elucidated hereinbelow with reference to FIG. 2.

Figure 2:
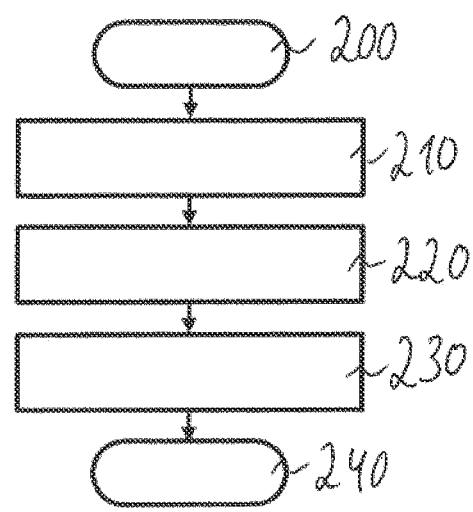
FIG. 2 shows a flow diagram of an exemplary embodiment of a method incorporating teachings of the present disclosure for determining the nitrogen oxide content and/or ammonia content in the exhaust gas of the exhaust tract of FIG. 1.

Referring to FIG. 2 an exemplary flow diagram of a method incorporating teachings of the present disclosure for determining the nitrogen oxide content and/or ammonia content in the exhaust gas downstream of the catalytic converter 100 of FIG. 1 is shown.

The method of FIG. 2 starts at step 200 and then goes on to step 210 in which an operating state of the internal combustion engine is determined. In particular this operating state of the internal combustion engine indicates lean operation or rich operation of the internal combustion engine. Rich operation of the internal combustion engine is characterized in that, compared to a stoichiometric ratio of oxygen to fuel where all fuel and oxygen is burnt, there is a fuel excess and the exhaust gas thus comprises an excess of unburned fuel and a deficiency of oxygen. Rich exhaust gas is therefore concerned. By contrast, lean operation of the internal combustion engine describes operation with an oxygen excess relative to the fuel. This leads to an oxygen excess in the exhaust gas and lean exhaust gas is therefore concerned.

In step 210, a lambda value may be determined using the exhaust gas sensor 110 in particular to determine the operating state of the internal combustion engine. In addition to generating a main signal indicating the nitrogen oxide content and/or ammonia content the exhaust gas sensor may further generate a linear and/or binary lambda signal which in turn allows determination of the lambda value which is characterizing for the operating state of the internal combustion engine.

In a further step 220, the exhaust gas sensor 110 generates at least one (main) signal which indicates the sum of the contents of nitrogen oxide and ammonia in the exhaust gas of the internal combustion engine downstream of the catalytic converter 100.

In a subsequent step 230, the nitrogen oxide content and/or ammonia content in the exhaust gas of the internal combustion engine is determined at least partially based on the determined operating state of the internal combustion engine and at least partially based on the at least one (main) signal of the exhaust gas sensor 110. In some embodiments, the at least one generated signal of the exhaust gas sensor 110 indicates the nitrogen oxide content in the exhaust gas when the determined lambda value is greater than a lambda threshold value. In some embodiments, the at least one generated signal of the exhaust gas sensor 110 indicates the ammonia content in the exhaust gas when the determined lambda value is smaller than the lambda threshold value. This may be useful especially when the determined lambda value is determined based on the binary lambda signal of the exhaust gas sensor 110.

In some embodiments, in the case of a rich exhaust gas the three-way catalytic converter 100 produces ammonia and the nitrogen oxides are reduced almost completely in the three-way catalytic converter 100. This has the result that in this operating state of the internal combustion engine where rich exhaust gas is present virtually only ammonia is present downstream of the catalytic converter 100 but no nitrogen oxide. Accordingly, the signal of the exhaust gas sensor 110 may then be interpreted as being completely indicative of the ammonia content, wherein the nitrogen oxide content is 0.

The lambda threshold value may be a specified value, for example 200 mV. In some embodiments, the lambda threshold value may be dynamically adjusted during operation according to the operating parameters of the internal combustion engine and/or the exhaust tract 10. For example, the lambda threshold value may be determined based on the temperature of the exhaust gas, the temperature of the catalytic converter, the exhaust gas mass flow, the exhaust gas volume flow, the exhaust gas flow rate, and/or the catalytic converter aging condition and dynamically adapted.

In step 230, the method may include determining the exhaust gas mass flow. The exhaust gas mass flow may be determined for example from the signals of a pressure sensor or mass flow sensor arranged in the inlet tract of the internal combustion engine and/or via the operating parameters of the internal combustion engine. Determining the nitrogen oxide content and/or ammonia content in the exhaust gas of the internal combustion engine is then further based at least partially on a mass flow factor when the determined exhaust gas mass flow is greater than a predetermined exhaust gas mass flow threshold value.

In some embodiments, large exhaust gas mass flow values can result in incomplete conversion of nitrogen oxides on account of insufficient residence time in the catalytic converter 100 despite a rich exhaust gas, so that in this state both nitrogen oxides and ammonia may simultaneously be present downstream of the catalytic converter 100. Some embodiments include considering a mass flow factor when determining the nitrogen oxide content and/or ammonia content when the determined exhaust gas mass flow is greater than the predetermined exhaust gas mass flow threshold value. The mass flow factor may be configured for splitting the signal of the exhaust gas sensor 110 into a nitrogen oxide signal indicating the nitrogen oxide content and an ammonia signal indicating the ammonia content, wherein the nitrogen oxide content signal may be used to determine the nitrogen oxide content and the ammonia content signal may be used to determine the ammonia content in the exhaust gas of the internal combustion engine.

In some embodiments, the mass flow factor too may be a predetermined factor or may be dynamically adjusted according to the operating parameters of the internal combustion engine and/or the exhaust tract. Operating parameters include the temperature of the exhaust gas, the temperature of the catalytic converter, the exhaust gas mass flow, the exhaust gas volume flow, the exhaust gas flow rate and/or the catalytic converter aging condition.

In step 230, when determining the ammonia content in the exhaust gas of the internal combustion engine the method may additionally consider a (cross-)sensitivity of the exhaust gas sensor for ammonia. In particular, the main signal of the exhaust gas sensor 110 can indicate the sum of the contents of nitrogen oxide and ammonia, wherein the ammonia content is based on a sensitivity factor. This sensitivity factor may be adapted according to the aging of the exhaust gas sensor 110. In some embodiments, the sensitivity factor may be specified as a predetermined value at the factory. Step 230 may further determine/use the current cross-sensitivity of the exhaust gas sensor 100 and to consider it when determining the ammonia content in the exhaust gas of the internal combustion engine.

In some embodiments, the sensitivity factor may be a predetermined factor or may be dynamically adjusted according to the operating parameters of the internal combustion engine and/or the exhaust tract. Operating parameters include the temperature of the exhaust gas, the temperature of the catalytic converter, the exhaust gas mass flow, the exhaust gas volume flow, the exhaust gas flow rate and/or the catalytic converter aging condition.

The ammonia content may be a suitable indicator for the content of carbon monoxide and hydrocarbon in the exhaust gas of the internal combustion engine downstream of the catalytic converter 100. In particular, the determined ammonia content in the exhaust gas of the internal combustion engine may be used to determine the carbon monoxide content in the exhaust gas of the internal combustion engine at least partially based on a carbon monoxide correlation factor. In some embodiments, the determined ammonia content in the exhaust gas of the internal combustion engine may also be used to determine the hydrocarbon content in the exhaust gas of the internal combustion engine at least partially based on a hydrocarbon correlation factor.

Accordingly, an exhaust gas sensor 100 makes it possible to determine not only the nitrogen oxide content, the ammonia content and the carbon monoxide content but also the hydrocarbon content in the exhaust gas of the internal combustion engine downstream of the catalytic converter 100.

What is claimed is:

1. A method for determining the nitrogen oxide content and/or ammonia content in the exhaust gas of an internal combustion engine with a catalytic converter arranged in an exhaust tract and an exhaust gas sensor downstream of the catalytic converter, the method comprising:
   determining an operating state of the internal combustion engine;
   generating a first signal using the exhaust gas sensor;
   if the operating state indicates lean operation of the internal combustion engine, using the first signal to determine a nitrogen oxide content in the exhaust gas;
   if the operating state indicates rich operation of the internal combustion engine, using the first signal to determine an ammonia content in the exhaust gas; and
   determining the carbon monoxide content in the exhaust gas at least partially based on the determined ammonia content and a carbon monoxide correlation factor.

2. The method as claimed in claim 1, further comprising determining a lambda value using the exhaust gas sensor, wherein the determining of the operating state of the internal combustion engine is carried out at least partially based on the determined lambda value.

3. The method as claimed in claim 2, wherein:
   the lambda threshold value depends at least in part on the temperature of the exhaust gas, the temperature of the catalytic converter, the exhaust gas mass flow, the exhaust gas volume flow, the exhaust gas flow rate and/or the catalytic converter aging condition; or the lambda threshold value is predetermined as a specified value.

4. The method as claimed in claim 1, further comprising determining the exhaust gas mass flow;
   wherein determining of the nitrogen oxide content and/or ammonia content depends at least in part on a mass flow factor when the determined exhaust gas mass flow is greater than a predetermined exhaust gas mass flow threshold value.

5. The method as claimed in claim 4, wherein the mass flow factor depends on the temperature of the exhaust gas, the temperature of the catalytic converter, the exhaust gas mass flow, the exhaust gas volume flow, the exhaust gas flow rate, and/or the catalytic converter aging condition.

6. The method as claimed in claim 1, further comprising determining a sensitivity of the exhaust gas sensor for ammonia;
   wherein determining the ammonia content depends at least in part on the determined sensitivity of the exhaust gas sensor for ammonia.

7. The method as claimed in claim 1, further comprising determining the hydrocarbon content in the exhaust gas at least partially based on the determined ammonia content in the exhaust gas and a hydrocarbon correlation factor.

8. The method as claimed in claim 7, wherein the carbon monoxide correlation factor and/or the hydrocarbon correlation factor is determined based on the temperature of the exhaust gas, the temperature of the catalytic converter, the exhaust gas mass flow, the exhaust gas volume flow, the exhaust gas flow rate and/or the catalytic converter aging condition.

9. An exhaust tract for an internal combustion engine, the exhaust tract comprising:
   a catalytic converter for aftertreatment of the exhaust gas of the internal combustion engine;
   an exhaust gas sensor arranged downstream of the catalytic converter and configured for generating a signal indicating a content of the exhaust gas; and
   a control unit which receives the signals of the exhaust gas sensor and is programmed to execute a method comprising:
   determining an operating state of the internal combustion engine;
   generating a signal using the exhaust gas sensor;
   if the operating state indicates lean operation, using the signal to determine a nitrogen oxide content of the exhaust gas;
   if the operating states indicates rich operation of the internal combustion engine, using the signal to determine an ammonia content of the exhaust gas;
   and
   determining the carbon monoxide content in the exhaust gas at least partially based on the determined ammonia content and a carbon monoxide correlation factor.

* * * * *